United States Patent [19]

Kushida et al.

[11] Patent Number: 5,344,864
[45] Date of Patent: Sep. 6, 1994

[54] POLYVINYL CHLORIDE THERMOPLASTIC ELASTOMER COMPOSITION

[75] Inventors: Yuichiro Kushida; Shoichi Tamegai; Akio Hirohashi, all of Shibukawa, Japan

[73] Assignee: Denki Kagaku Kogyo Kabushiki Kaisha, Tokyo, Japan

[21] Appl. No.: 625,686

[22] Filed: Dec. 12, 1990

Related U.S. Application Data

[63] Continuation of Ser. No. 379,267, Jul. 13, 1989, abandoned.

[30] Foreign Application Priority Data

Jul. 15, 1988 [JP] Japan .................................. 63-174889

[51] Int. Cl.⁵ ................................................. C08K 3/26
[52] U.S. Cl. .................................... 524/426; 524/525; 524/527
[58] Field of Search ........................ 524/525, 527, 426

[56] References Cited

U.S. PATENT DOCUMENTS 2,330,353 9/1943 Henderson .
4,173,556 11/1979 Coran et al. ......................... 524/314
4,454,250 6/1984 Florence et al. .................... 525/193
4,826,910 5/1989 Schwarz .............................. 524/521

FOREIGN PATENT DOCUMENTS 0317814 5/1989 European Pat. Off. .
0353507 2/1990 European Pat. Off. .
61-195144 8/1986 Japan .
910807 11/1962 United Kingdom .
2120258 11/1983 United Kingdom ................ 524/525

OTHER PUBLICATIONS

Vinyl Chloride Resin Type Thermoplastic Elastomer Prepn. Elastomer with Compression Permanent Set, Head–Deformation and Oil Resistance Mfd. by Simple Kneading (Abstract of JP 61195144).

Primary Examiner—John C. Bleutge
Assistant Examiner—Mark Sweet
Attorney, Agent, or Firm—Oblon, Spivak, McClelland, Maier & Neustadt

[57] ABSTRACT

A thermoplastic elastomer composition comprising 100 parts by weight of a vinyl chloride resin, from 20 to 300 parts by weight of a nitrile rubber, from 25 to 200 parts by weight of a plasticizer, from 10 to 200 parts by weight of a filler and a curing agent for the rubber, and being meltable by a roll set at a temperature of 190° C.

8 Claims, 1 Drawing Sheet

POLYVINYL CHLORIDE THERMOPLASTIC ELASTOMER COMPOSITION

This application is a continuation application Ser. No. 07/379,267, filed on Jul. 13, 1989, now abandoned.

The present invention relates to a thermoplastic elastomer composition of a polyvinyl chloride-nitrile rubber (NBR) system having excellent processability, high tensile strength and low compression set and thus being useful as a substitute for vulcanized rubber, a process for producing such an elastomer composition and a molded product of such an elastomer composition. Here, the thermoplastic elastomer means a substance which exhibits both thermoplasticity and elasticity. Namely, it is a substance which is capable of being molded as a thermoplastic material by a usual molding method for plastics, such as extrusion molding, injection molding, blow molding or roll calendering and which at the same time exhibits elasticity like rubber. The thermoplastic elastomer provides a merit such that elasticity can be thereby obtained without necessity of a cumbersome vulcanization step as required in the case of usual vulcanized rubber.

The vinyl chloride resin is generally excellent in the chemical and physical properties and provides a soft molded product having a suitable elasticity and excellent flexibility when a plasticizer is incorporated thereto. As such, it is used in many applications as resin material for various molded products such as films, sheets, tubes or containers.

However, molded products of a plasticized vinyl chloride resin have difficulties such that they have strong creep tendency and large compression set and thus are poor in the restorability when the compression force has been removed. For example, a soft molded product obtainable by incorporating a plasticizer to a usual vinyl chloride resin has a compression set as large as from 60 to 70% as measured in accordance with JIS K-6301 at 70° C. for 22 hours under a compression rate of 25% (the same applies hereinafter when the compression set is referred to). Therefore, its use for the applications where a small compression set is required, such as packing, is limited.

In order to reduce the compression set for improvement, it has been attempted to use such a plasticized vinyl chloride resin in combination with a partially cross-linked NBR. For example, such use is disclosed in the following literatures.

(1) Rubber Age, July, 1973, p.43–47
(2) Rubber World, March, 1973, p.42–50
(3) Rubber Chemistry and Technology, Rubber Reviews for 1978, p.395–397
(4) L'Official des Plastique et du Caoutchauc, Mai, 432–437 (1979)

However, it is hardly possible to reduce the compression set to a level of less than 40%, although it may be reduced to a level of from 40 to 50%, by the above-mentioned methods. The improvement is still inadequate to use the product as a substitute for vulcanized rubber.

If it is attempted to reduce the compression set by increasing the amount of incorporation of the partially cross-linked NBR as a component to reduce the compression set of a vinyl chloride resin, there will be a drawback that other important properties such as tensile strength, elongation and tear strength tend to deteriorate, although the compression set may be reduced to a level of about 40%. For example, the results will be as shown in the following Table 1.

TABLE 1

| Test No. | 1 | 2 | 3 | 4 | 5 |
|---|---|---|---|---|---|
| PVC ($\bar{P}$ = 3000) | 100 | 100 | 100 | 100 | 100 |
| Chemigum P8B1-A-2* | 0 | 30 | 50 | 100 | 150 |
| Dioctyl phthalate | 100 | 100 | 100 | 100 | 100 |
| Ba—Zn stabilizer | 3 | 3 | 3 | 3 | 3 |
| Epoxidized soybean oil | 3 | 3 | 3 | 3 | 3 |
| Tensile strength (kg/cm$^2$) | 120 | 102 | 101 | 83 | 75 |
| Elongation (%) | 420 | 380 | 350 | 290 | 290 |
| Compression set (%) | 55 | 51 | 46 | 41 | 38 |

*Partially pre-crosslinked NBR manufactured by Good Year Co.

Accordingly, for a thermoplastic elastomer to be useful as a substitute for conventional vulcanized rubber, the thermoplastic elastomer is desired to satisfy both requirements for the mechanical strength and the compression set.

The present inventors have conducted various studies to obtain a polyvinyl chloride thermoplastic elastomer composition having a low compression set and high strength while maintaining the desired properties as the thermoplastic elastomer. As a result, they have found it possible to obtain a thermoplastic elastomer having the compression set and breaking stress improved while maintaining the thermoplasticity by adding a usual curing agent for rubber to a system comprising a vinyl chloride resin, a nitrile rubber, a plasticizer and a filler and reacting the mixture under kneading.

The present invention provides a thermoplastic elastomer composition comprising 100 parts by weight of a vinyl chloride resin, from 20 to 300 parts by weight of a nitrile rubber, from 25 to 200 parts by weight of a plasticizer, from 10 to 200 parts by weight of a filler and a curing agent for the rubber, and being meltable by a roll set at a temperature of 190° C.

Now, the present invention will be described in further detail with reference to the preferred embodiments.

Figure 1:
FIG. 1 is a cross sectional view of a molded glass run channel product.

When the thermoplastic elastomer composition of the present invention is kneaded at a temperature of from 140° to 220° C, preferably from 150° to 210° C., the curing agent in the composition reacts with the nitrile rubber to provide a high tensile strength of at least 120 kg/cm$^2$ and an excellent compression set of at most 40% while maintaining the thermoplasticity. From the experimental results shown in Table 2, it is evident that the reason for the improvement of the breaking tensile stress and the compression set while maintaining the processability as the thermoplastic elastomer by the addition and reaction of the curing agent is that the curing agent scarcely reacts with the PVC component serving to maintain the plasticity of the composition and reacts exclusively with NBR. Namely, in the case of NBR, the gel content increases and the swelling decreases by the addition of the curing agent. This indicates that the cross linking reaction has taken place. Whereas, with PVC, the gel content scarcely increases under such conditions, thus showing that no substantial reaction has taken place. Thus, it is assumed that with the mixture of PVC and a nitrile rubber, the curing agent predominantly reacts with the nitrile rubber and scarcely reacts with PVC.

an alkyl methacrylate, acrylonitrile, an alkylvinyl ether, styrene and derivatives thereof.

NBR useful in the present invention preferably contains from 20 to 45% of bound acrylonitrile, and it may be of a non-cross-linked type or a cross-linked type.

The composition of the present invention in which a partially pre-crosslinked type NBR is employed, provides stabilized extrusion processability and provides a molded product having a smooth surface. On the other hand, the composition in which a non-cross-linked NBR is employed, provides a large elongation.

The amount of NBR is from 20 to 300 parts by weight

TABLE 2

| Test No. | 6 | 7 | 8 | 9 | 10 | 11 | 12 | 13 | 14 |
|---|---|---|---|---|---|---|---|---|---|
| Chemigum P8B1A-2 | 100 | 100 | 100 | — | — | — | — | — | — |
| JSR PN-30A | — | — | — | 100 | 100 | 100 | — | — | — |
| PVC SH-170 | — | — | — | — | — | — | 53 | 53 | 53 |
| Dioctyl phthalate (plasticizer) | — | — | — | — | — | — | 47 | 47 | 47 |
| Ba—Zn system (stabilizer) | — | — | — | — | — | — | 1.6 | 1.6 | 1.6 |
| Epoxidized soybean oil | — | — | — | — | — | — | 1.6 | 1.6 | 1.6 |
| Perhexa 3M-40* | 0 | 1 | 2 | 0 | 1 | 2 | 0 | 1 | 2 |
| Triallyl isocyanurate** | 5 | 5 | 5 | 5 | 5 | 5 | 5 | 5 | 5 |
| Gel content (%) | 78.5 | 82.3 | 85.2 | 5.3 | 81.5 | 89.8 | 0.1 | 0.1 | 0.4 |
| Swelling | 15.4 | 10.0 | 7.5 | — | 10.5 | 8.5 | — | — | — |

*Amount of the product of a purity of 40 wt %.
**Cross linking assistant.

The tests were conducted in the following manner.

Into a Brabender Plastograph having the jacket temperature preliminarily adjusted to 150° C., 60 g of the blend composition of Test No. 6, to No. 14 was charged and kneaded for 10 minutes at a rotational speed of 60 rpm to obtain a block or powdery product. The block product thereby obtained was sheeted by rolls, and the sheet was then cut into pieces and dissolved in tetrahydrofuran at a concentration of 0.5%. Whereas, the powder product was in its form dissolved in tetrahydrofuran at a concentration of 0.5%. The solution was left at room temperature for 20 hours under gentle shaking, whereupon the gel content (%) was obtained from the insolubles, and the swelling degree was obtained by dividing the weight of the swelled state (the state containing tetrahydrofuran) by the weight of the insoluble polymer after drying.

MATERIALS USED

Chemigum P8B1A-2: Partially pre-crosslinked NBR (manufactured by Good Year Co.)

JSR PN-30: Non-cross-linked NBR (manufactured by Japan Synthetic Rubber Co., Ltd.)

PVC SH-170: Vinyl chloride homopolymer having a polymerization degree of 1,700 (manufactured by Denki Kagaku Kogyo Kabushiki Kaisha)

Perhexa 3M-40: Peroxide type curing agent, 1,1-bis-tert-butylperoxy-3,3,5-trimethylcyclohexane (purity: 40% by weight, manufactured by Nippon Oil and Fats Co., Ltd.)

The vinyl chloride resin to be used for the thermoplastic elastomer composition of the present invention, may be a usual vinyl chloride resin, and it is usual to employ a vinyl chloride resin having an average degree of polymerization of from 700 to 6,000.

Further, the vinyl chloride resin includes copolymers of vinyl chloride with the following monomers. Namely, such monomers include, for example, a fatty acid vinyl ester, a vinylidene halide, an alkyl acrylate, relative to 100 parts by weight of the vinyl chloride resin. If the amount is less than 20% by weight, the effect of reducing the compression set tends to be too weak. On the other hand, if the amount exceeds 300 parts by weight, the processability tends to be poor. Particularly preferred is an amount within a range of from 20 to 200 parts by weight.

As to the plasticizer, there is no particular restriction. Any plasticizer may be employed so long as it is useful for the production of a plasticized vinyl chloride resin product. For example, it may be a plasticizer of a phthalic acid ester type, a trimellitic acid ester type, a pyromellitic acid ester type, an aliphatic dibasic acid ester type, a glycol ester type, a fatty acid ester type, a phosphoric acid ester type or a citric acid ester type. Further it may be an epoxy type plasticizer or polyester type plasticizer.

The amount of the plasticizer is from 25 to 200 parts by weight relative to 100 parts by weight of the vinyl chloride resin. If the amount is less than 25 parts by weight, the processability tends to be poor and the product tends to be too hard, thus failing to present the characteristics as an elastomer. On the other hand, if it exceeds 200 parts by weight, the physical properties tend to deteriorate to a practically useless level.

As the curing agent, any curing agent useful for curing (or vulcanizing) rubber, may be employed.

A suitable curing agent system includes a sulfur + vulcanization accelerator system, and a system using a peroxide, an azide, a maleimide or a phenol resin as the base.

Specific examples of the curing agent include sulfur, zinc oxide, magnesium oxide, an organic peroxide, triazinethiol, a benzothiazole sulfenamide accelerator, benzothiazyl disulfide, a phenol resin, m-phenylene bismaleimide, thiuram disulfide and dipentamethylene thiuram hexasulfide.

Preferred organic peroxide curing agents include, for example, lauryl peroxide, benzoyl peroxide, bis-2,4- dichlorobenzoyl peroxide, dicumyl peroxide, di-tert-butyl peroxide, 2,5-dimethyl-2,5-bis(tert-butyl peroxy)-hexane, 1,1-bis(tert-butylperoxy)-2,3,5-trimethylcyclohexane, tris-α,α-dimethyl-α-(tert-butylperoxy)methylbenzene, αα-bis(butylperoxy)diisopropylbenzene, bis(4-tertbutylcyclohexyl)peroxydicarbonate and tert-butyl perbenzoate.

Further, preferred phenol resin curing agents include, for example, a reactive type alkyl phenolformaldehyde resin and a reactive type brominated alkylphenol-formaldehyde resin, specifically TACKIROL 201 and TACKIROL 250 (both manufactured by Sumitomo Chemical Co., Ltd.), respectively.

As an accelerator, an aldehyde ammonia, an aldehyde amine, guanidine, a thiourea, a thiazole, a dithiocarbamic acid salt, a xanthogenic acid salt or a thiuram, may be used.

Further, as a curing assistant, dibenzo-p-quinonedioxime, p-quinonedioxime, p-phenylenebismaleimide, a trialkyl cyanurate, ethylene glycol dimethacrylate, pentaerythritol triacrylate, trimethylolpropane triacrylate or neopentylglycol diacrylate may be employed.

The amount of the curing agent varies depending upon the type of the curing agent and the combination with an accelerator, but is usually at least 0.1 part by weight relative to 100 parts by weight of the total amount of the vinyl chloride resin and NBR.

As the filler, carbon black, calcium carbonate, titanium oxide, talc, asbestos, aluminum hydroxide, magnesium hydroxide, clay, silica, white carbon, etc. may be used in an amount of from 10 to 200 parts by weight resin. If the amount of the filler is less than 10 parts or more than 200 parts, the physical properties of the product tend to deteriorate.

Further, other additives such as a heat stabilizer, a lubricant, a processing assistant, a pigment and a flame retardant, may be incorporated in a proper amount, as the case requires.

The heat stabilizer includes, for example, a lead type heat stabilizer such as tribasic lead sulfate, a tin type stabilizer such as dibutyltin maleate and a metal soap such as zinc stearate or calcium stearate, and it is used in a suitable amount as the case requires.

The pigment includes, for example, color carbon black, chrome yellow, titanium oxide and phthalocyanine green, and it is used in a suitable amount as the case requires.

The processing assistant may be the one commonly used for a vinyl chloride resin, such as a low molecular weight polyethylene or a higher fatty acid ester.

To the elastomer composition of the present invention, other plastics or rubbers may be incorporated for modification as the case requires. For example, a polyurethane, an acrylate resin, a methacrylate resin, an ABS resin, a MBS resin, a nylon resin, polychloroprene, EPDM and modified EPDM may be mentioned.

The thermoplastic elastomer composition of the present invention can be prepared by kneading the above-mentioned various components by means of a kneader which is commonly used for kneading a plasticized vinyl chloride resin blend, such as an open roll mill, a kneader of closed system such as a Banbury mixer, a pressure kneader or an intensive mixer, a usual single screw extruder, a twin screw extruder, a cokneader, an extruder having two screws rotating in the same direction (TEM manufactured by Toshiba Kikai K.K. or PCM manufactured by Ikegai Tekko K.K.), a kneader rudder type high speed agitation extruder (FCM manufactured by Kobe Steel Ltd.), Plastifikator, manufactured by Wener and Pfleiderner, West Germany, or Plasticator, manufactured by Ikki Seisakusho, which is a kneading extruder comprising a conical rotor having a plurality of grooves on its surface and a barrel having a recess well corresponding to the outer shape of the rotor and having a plurality of grooves on the surface of the recess well, a KCK continuous kneading extruder manufactured by Kabushiki Kaisha KCK, which is a kneading extruder comprising an extruder screw having a plurality of collar blades and a barrel having an internal shape corresponding to the outer shape of the screw, or a Brabender mixer. Among these kneaders, a closed system kneader is preferred since the kneading time can thereby freely be selected, and the extruder having twin screws rotating in the same direction, Plastifikator, Plastifikator and the KCK continuous kneading extruder are preferably employed in view of their excellent kneading effects.

Kneading is conducted usually by adjusting the jacket temperature, the rotational speed and the kneading time so that the temperature of the blend composition itself will be at a level of from 140° to 220° C., preferably from 150° to 210° C. As opposed to the kneading in the initial stage for the preparation of a usual vulcanized rubber wherein the temperature of the blend composition is maintained at a level of not higher than about 120° C. to suppress the reaction of the curing agent, according to the present invention, kneading is conducted at a high temperature suitable for the particular curing agent used, within a range of from 140° to 220° C., preferably from 150° to 210° C., in order to let the reaction of the curing agent proceed during the kneading.

If the temperature of the blend composition to be kneaded is less than 140° C., the reaction of the curing agent tends to proceed inadequately. On the other hand, if the temperature exceeds 220° C., the composition tends to undergo thermal decomposition. In each case, desired molding composition tends to be hardly obtained.

For molding the thermoplastic elastomer composition of the present invention, a molding machine commonly used for molding a usual resin material may be employed such as an extrusion molding machine, an injection molding machine, a calender molding machine or a compression molding machine. Accordingly, a desired molded product can be obtained without requiring a time-consuming vulcanization step commonly required for a usual vulcanizate. Further, as opposed to the case of vulcanized rubber, defective products or non-useful portions of molded products such as sprue runner portions formed during the molding of the composition of the present invention, may be reused together with the same composition or together with other thermoplastic resins for molding, if necessary, after being treated by e.g. pulverization treatment.

For the kneading by means of such a kneader, a part or whole of the starting materials may preliminarily be blended by a separate Henschel mixer or ribbon blender before supplying it to the kneader, or the starting material may directly be supplied to the kneader without conducting such preliminarily blending. Otherwise, a part of materials may preliminary be pelletized before supplying to the kneader.

The starting material NBR may be in a block form or in a powder form.

By virtue of the excellent creep resistance, the dimensional stability at high temperatures, the low compression set and the high mechanical strength, the molded product of the composition of the present invention is useful for various applications for which conventional vulcanized rubber is employed, and the shape of the molded product is not limited, so that it is useful for various applications in a wide range of fields such as industrial, automobile and building fields, for example, for packings, gaskets, sheets, hoses, tubes, rolls, grips, grommets, glass channels, weather strips, mud-guards, dust boots, various containers and cushions.

The molded product of the present invention can be produced without requiring a cumbersome vulcanization step as required for rubber and can be readily provided by a molding method similar to the one for thermoplastic materials.

Now, the present invention will be described in further detail with reference to Examples. However, it should be understood that the present invention is by no means restricted to such specific Examples.

| | |
|---|---|
| Vinyl chloride resin having an average degree of polymerization of 1700 (Denka vinyl SH-170, manufactured by Denki Kagaku Kogyo Kabushiki Kaisha) | 100 parts by weight (1 kg) |
| Ba—Zn fatty acid salt composite stabilizer (BZ-100J, manufactured by Katsuta Kako K.K.) | 3 parts by weight |
| Epoxidized soybean oil (Adekacizer O-130P, manufactured by Adeka Argus Chemical Co.) | 3 parts by weight |
| Calcium carbonate (NS-400, manufactured by Nitto Funka Kogyo K.K.) | 50 parts by weight |
| Sulfur | 1.5 parts by weight |
| Tetramethylthiuran disulfide (Nocceler CZ, manufactured by Ouchi Shinko K.K.) | 1 part by weight |
| Zinc oxide | 5 parts by weight |
| Partially pre-crosslinked powdery NBR (Chemigum P8B1A2, manufacture by Good Year Co.) | 50 parts by weight |
| Di-2-ethylhexyl phthalate (DOP) | 90 parts by weight |

The above components were charged into a pressure kneader manufactured by Moriyama Seisakusho with a jacket temperature of 150° C. and kneaded for 10 minutes at a fore roll rotational speed of 51 rpm and at a rear roll rotational speed of 34 rpm, whereupon the temperature of the resin composition was 175° C. The respective components were added in the above identified parts by weight relative to 100 parts by weight (1 kg) of the vinyl chloride resin. The total amount of the components was about 3 kg.

The composition thus obtained was kneaded by 12 inch twin rolls preset at a surface temperature of 180° C. for 10 minutes to obtain a sheet, which was press-molded to obtain test pieces, which were then subjected to a tensile strength test, a tear strength test and a compression set test. Further, a part of the sheet was subjected to a sheet pelletizer to obtain angular pellets, which were used for flexible contour extrusion, whereby the processability was evaluated from the outer appearance of the extruded product. The results are shown in Table 4.

COMPARATIVE EXAMPLE 1

The operation was conducted in the same manner as in Example 1 except that sulfur and Nocceler CZ were not used.

EXAMPLES 2 to 6

The operation was conducted in the same manner as in Example 1 except that the blend composition was as identified in Table 4.

EXAMPLE 7

The operation was conducted in the same manner as in Example 1 except that instead of the pressure kneader of closed system used in Example 1, a 75 l Henschel mixer of open system was employed, and NBR was not added at the initial stage and was added after the mixture was dried up by high speed rotation to a free-flowing powder, followed by gentle agitation.

The powdery blend composition thus obtained was fed to a twin screw extruder (TEM-50B, manufactured by Toshiba Kikai K.K.) preset at a cylinder temperature of 150° C. and pelletized at a rotational speed of 100 rpm.

EXAMPLES 8 to 12

The operation was conducted in the same manner as in Example 1 except that the blend composition was as identified in Table 4.

COMPARATIVE EXAMPLES 2 to 6

The operation was conducted in the same manner as in Example 1 except that the blend composition was as shown in Table 4.

EXAMPLE 13

The composition obtained in Example 1 was kneaded by 12 inch twin rolls preset at a surface temperature of 180° C. to obtain a sheet, which was subjected to a pelletizer to obtain angular pellets. From such pellets, glass run channels and weather strippings as automobile parts and tubes were prepared by means of a 40 mm extruder, and the practical physical properties were measured. The results are shown in Table 3.

COMPARATIVE EXAMPLE 7

From the composition prepared by the process of Comparative Example 1, glass channels, weather strippings and tubes were prepared in the same manner as in Example 13, and the practical physical properties were measured. The results are shown in Table 3.

In the Examples and Comparative Examples, the tensile strength ($T_B$), the elongation ($E_B$), the tear strength (TR) and the compression set ($C_s$) were measured in accordance with the following methods:

Tensile strength ($T_B$): In accordance with JIS K-6723.

Elongation ($E_B$): In accordance with JIS K-6723.

Tear strength (TR): In accordance with JIS K-6301, method B.

Compression set ($C_s$): In accordance with JIS K-6301 at 70° C. for 22 hours under a compression rate of 25%.

TABLE

| Molded products | Tested properties | Example 13 | Comparative Example 7 |
|---|---|---|---|
| Glass channels | Compression | 41 | 65 |

TABLE-continued

| Molded products | Tested properties | Example 13 | Comparative Example 7 |
|---|---|---|---|
| Weather strippings | Compression set (%) | 45 | 55 |
| Tubes | Hydraulic pressure resistance (or water leaking pressure (kg/cm²) | 10.5 | 6.1 |

It is evident that with respect to each of the tested properties, Example 13 is superior to Comparative Example 7.

The testing methods were as follows.

(1) Glass run channels

Figure 2:
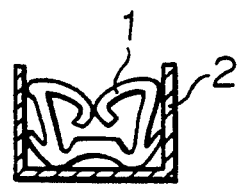
FIG. 2 is a cross sectional view of the same molded glass run channel product put in a casing.
Figure 3:
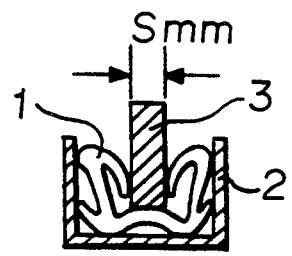
FIG. 3 is a cross sectional view of the same glass run channel product put in a metal casing in which a spacer was inserted.
Figure 4:
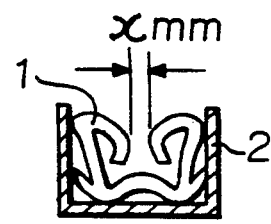
FIG. 4 is a cross sectional view of the same glass run channel product from which the spacer was removed to determine the residual strain.

As diagrammatically illustrated by a cross sectional view in FIG. 1, a glass run channel product 1 was prepared by extrusion molding by means of a 40 mm extruder. The glass channel product 1 having a length of about 20 cm thus obtained was put into a casing 2 made of metal as shown in FIG. 2, and a spacer 3 made of glass having a thickness (S) of 5 mm was inserted. This assembly was introduced into a Geer oven tester, left to stand at 90° C. for 24 hours and then withdrawn, and the spacer was immediately removed. 30 Minutes later, the residual strain x mm was measured as shown in FIG. 4.

The compression set (%) was calculated by the following equation.

$$\text{Compression set (\%)} = \frac{x}{S} \times 100$$

where x is the residual strain, and S is the thickness of the spacer.

(2) Tubes

A tube having an internal diameter of about 4 mm and an outer diameter of about 7.5 mm was prepared by extrusion molding by means of a 40 mm extruder. To one end of the tube having a length of about 50 cm thus obtained, a tubular connector having an outer diameter of 8 mm was inserted for a insertion length of 14 mm, and the other end of the tube was closed. The assembly was subjected to heat treatment at 100° C. for 8 hours in a Geer oven tester. Then, a hydraulic pump was connected to the tubular connector, and the pressure was increased at a rate of from 15 to 25 kg/cm²/min, whereby the pressure at the time when water leakage started was measured, and this pressure was taken as the hydraulic pressure resistance.

(3) Weather strippings

Figure 5:
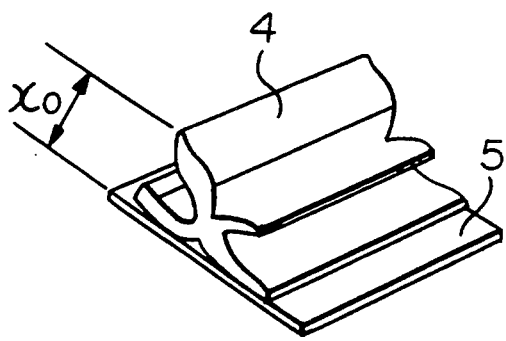
FIG. 5 is a perspective view of a molded weather stripping product.
Figure 6:
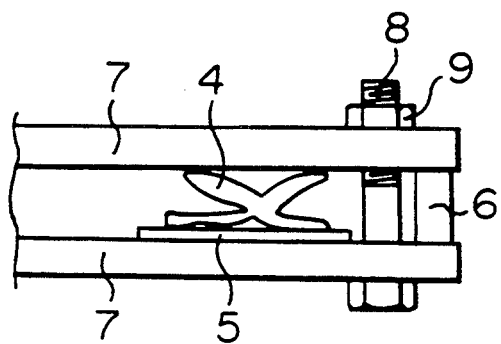
FIG. 6 is a cross sectional view of the same molded weather stripping product compressed by a device for measuring the compression set.

As illustrated by a cross section in FIG. 5, a weather stripping product 4 was prepared by extrusion molding by means of a 40 mm extruder. The molded product 4 was secured to a sample holder plate 5 by e.g. an adhesive, for measuring the compression set. The assembly was set in the device for measuring the compressing set as shown in FIG. 6 with a spacer 6 to determine the height $x_2$ so that the compression rate of the molded product i.e. the test sample would be 30%, as shown in FIG.6. In FIG. 6, reference numeral 7 indicates a compressing plate, numeral 8 indicates a bolt and numeral 9 indicates a nut.

The assembly was introduced into a Geer oven tester, left at 90° C. for 24 hours and then withdrawn. The spacer was immediately removed, and 30 minutes later, the height of the test sample was measured. The compression set was calculated by the following equation.

$$\text{Compression set (\%)} = \frac{x_0 - x_1}{x_0 - x_2} \times 100$$

where $x_0$ is the initial height of the test sample, $X_1$ is the height of the test sample after the test, and $x_2$ is the height of the spacer or the height of the test sample under compression.

In the following Tables, "parts" means "parts by weight".

TABLE 4

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Vinyl chloride resin (parts) | 100 | 100 | 100 | 100 | 100 | 100 | 100 | 100 | 100 | 100 | 100 | 100 |
| Average degree of polymerization 1700 | | | | | | | | | | | | |
| NBR (parts) | | | | | | | | | | | | |
| Chemigum P8B1A2 | 50 | 50 | 50 | 50 | 50 | | 50 | | 50 | 280 | 50 | 100 |
| JSR PN-30A | | | | | | 50 | | 20 | | | | |
| Plasticizer (parts) | 90 | 90 | 90 | 90 | 90 | 90 | 90 | 90 | 90 | 50 | 30 | 190 |
| DOP | | | | | | | | | | | | |
| Additives (parts) | | | | | | | | | | | | |
| Ba—Zn stabilizer | 3 | 3 | 3 | 3 | 3 | 3 | 3 | 3 | 3 | 3 | 3 | 3 |
| Epoxidized soybean oil | 3 | 3 | 3 | 3 | 3 | 3 | 3 | 3 | 3 | 3 | 3 | 3 |
| Filler (parts) | | | | | | | | | | | | |
| Calcium carbonate | 50 | 50 | 50 | 50 | | | | | | | | |
| Carbon black | | | | | 50 | 50 | 50 | 50 | 50 | 50 | 20 | 50 |
| Curing agent (parts) | | | | | | | | | | | | |
| Sulfur | 1.5 | 1.5 | 1.5 | | 1.5 | 1.5 | 1.5 | 1.5 | 1.5 | 1.5 | 1.5 | 1.5 |
| Nocceler CZ | 1 | | | | 1 | 1 | 1 | 1 | 1 | 1 | 1 | 1 |
| Zinc oxide | 5 | 5 | 5 | | 5 | 5 | 5 | 5 | 5 | 5 | 5 | 5 |
| Perhexa 3M-40 | | | | 1 | | | | | | | | |
| Triallyl isocyanurate | | | | 5 | | | | | | | | |
| Tetramethylthiuram disulfide | | 1 | | | | | | | | | | |
| Dibenzothiazyl disulfide | | | 2 | | | | | | | | | |
| Kneader | PK* | PK* | PK* | PK* | PK* | PK* | TE* | PK* | PK* | PK* | PK* | PK* |
| Jacket temperature (°C.) | 150 | 150 | 150 | 150 | 150 | 150 | 150 | 150 | 150 | 150 | 150 | 150 |
| Resin temperature (°C.) | 175 | 175 | 173 | 173 | 190 | 190 | 200 | 191 | 160 | 180 | 200 | 180 |
| Processability | ○ | ○ | ○ | ○ | ○ | ○ | ○ | ○ | ○ | ○ | ○ | ○ |
| $T_B$ (kg/cm²) | 170 | 165 | 172 | 175 | 180 | 175 | 158 | 153 | 150 | 120 | 180 | 125 |
| $E_B$ (%) | 300 | 330 | 310 | 350 | 320 | 450 | 350 | 300 | 320 | 305 | 280 | 310 |

TABLE 4-continued

| | | | | | | | | | | | | | |
|---|---|---|---|---|---|---|---|---|---|---|---|---|---|
| TR (kg/cm) | | 31 | 33 | 31 | 35 | 36 | 38 | 37 | 30 | 29 | 32 | 50 | 35 |
| $C_S$ (%) | | 32 | 32 | 32 | 30 | 30 | 38 | 35 | 39 | 38 | 22 | 35 | 35 |

| | Comparative Example | | | | | |
|---|---|---|---|---|---|---|
| | 1 | 2 | 3 | 4 | 5 | 6 |
| Vinyl chloride resin (parts) | 100 | 100 | 100 | 100 | 100 | 100 |
| Average degree of polymerization 1700 | | | | | | |
| NBR (parts) | | | | | | |
| Chemigum P8B1A2 | 50 | 50 | 50 | 350 | 50 | 50 |
| JSR PN-30A | | | | | | |
| Plasticizer (parts) | 90 | 20 | 250 | 90 | 90 | 90 |
| DOP | | | | | | |
| Additives (parts) | | | | | | |
| Ba—Zn stabilizer | 3 | 3 | 3 | 3 | 3 | 3 |
| Epoxidized soybean oil | 3 | 3 | 3 | 3 | 3 | 3 |
| Filler (parts) | | | | | | |
| Calcium carbonate | 50 | | | | | |
| Carbon black | | | 50 | 50 | 50 | 50 |
| Curing agent (parts) | | | | | | |
| Sulfur | | 1.5 | 1.5 | 1.5 | 1.5 | 1.5 |
| Nocceler CZ | | 1 | 1 | 1 | 1 | 1 |
| Zinc oxide | | 5 | 5 | 5 | 5 | 5 |
| Perhexa 3M-40 | | | | | | |
| Triallyl isocyanurate | | | | | | |
| Tetramethylthiuram disulfide | | | | | | |
| Dibenzothiazyl disulfide | | | | | | |
| Kneader | PK* | PK* | PK* | PK* | PK* | PK* |
| Jacket temperature (°C.) | 150 | 150 | 150 | 150 | 100 | 190 |
| Resin temperature (°C.) | 183 | 200 | 192 | 175 | 120 | 230 |
| Processability | | | | | | |
| $T_B$ (kg/cm$^2$) | ○ | X | ○ | X | X | Decomposed |
| $E_B$ (%) | 280 | 200 | 250 | 150 | 230 | (not |
| TR (kg/cm) | 18 | 40 | 19 | 12 | 25 | measurable) |
| $C_S$ (%) | 54 | 45 | 45 | 25 | 45 | |

*PK: Pressure kneader
**TE: twin extruder (rotation: same direction)
○: Excellent
X: Poor Vinyl chloride resin having an average degree of polymerization of 1700: Denka Vinyl SH-170, manufactured by Denki Kagaku Kogyo Kabushiki Kaisha Chemigum P8B1A2: Powdery NBR, mooney viscosity: 79, bound acrylonitrile: 33%, partially pre-crosslinked type, manufactured by Good Year Co.

JSR PN-30A: Powdery NBR, mooney viscosity: 56, bound acryronitrile: 35%, non-cross-linked type, Japan Synthetic Rubber Co., Ltd.

DOP: Di-2-ethylhexyl phthalate, W520, manufactured by Dainippon Ink K. K.

Ba-Zn stabilizer: Ba-Zn fatty acid salt composite stabilizer, BZ-100J, manufactured by Katsuta Kako K. K.

Epoxidized soybean oil: Adekacizer O-130P, manufactured by Adeka Argus Chemical Co.

Calcium carbonate: NS-400, manufactured by Nitto Funka Kogyo K. K.

Carbon black: Diablack H, manufactured by Mitsubishi Kasei Corporation

Sulfur: Powder sulfur, manufactured by Hosoi Kagaku Kogyo K. K.

Nocceler CZ: N-cyclohexyl-2-benzothiazyl sulfeneamide, manufactured by Ouchi Shinkosha Zinc oxide: ZINCA 10, manufactured by Sakai Kagaku Kogyo K. K.

Perhexa 3M-40: Peroxide, 1,1-bis-tert-butylperoxy-3,3,5-trimethylcyclohexane (purity: 40% by weight), manufactured by Nippon Fat and Oil Co., Ltd.

Triallyl isocyanurate: manufactured by Kurogane Kasei K. K.

Tetramethylthiuram disulfide: Nocceler TT, manufactured by Ouchi Shinkosha

Dibenzothiazyl disulfide: Nocceler DM, manufactured by Ouchi Shinkosha

We claim:

1. A thermoplastic elastomer composition obtained by a process consisting essentially of simultaneously kneading and curing at a temperature from 140°–220° C. a mixture comprising 100 parts by weight of vinyl chloride resin, from 20–300 parts by weight of a powdery and partially pre-crosslinked copolymer of butadiene and acrylonitrile, from 25–200 parts by weight of a plasticizer, from 10–200 parts by weight of a filler and curing agent for the rubber which cures at a temperature ranging from 140°–220° C., said composition being meltable by a roll set at a temperature of 190° C.

2. The thermoplastic elastomer composition according to claim 1, wherein said partially pre-crosslinked copolymer of butadiene and acrylonitrile contains from 20 to 45% of a bound acrylonitrile.

3. The thermoplastic elastomer composition according to claim 1 wherein said plasticizer is a member selected from the group consisting of phthalic acid esters, trimellitic acid esters, pyromellitic acid esters, aliphatic dibasic acid esters, glycol esters, fatty acid esters, phosphoric acid esters and citric acid esters.

4. The thermoplastic elastomer composition according to claim 1 wherein said curing agent is sulfur, zinc oxide, magnesium oxide, an organic peroxide, triazine-thiol, a benzothiazole sulfenamide accelerator, benozthiazyl disulfide, a phenol resin, m-phenylene bismaleimide, thiuram disulfide or dipentamethylene thiuram hexasulfide.

5. The thermoplastic elastomer composition according to claim 1, wherein the amount of said curing agent in the composition is at least 0.1 point by weight per 100 parts by weight of the total amount of vinyl chloride resin and partially pre-crosslinked copolymer of butadiene and acrylonitrile.

6. The thermoplastic elastomer composition according to claim 1, wherein the filler is carbon black and/or calcium carbonate.

7. The thermoplastic elastomer composition according to claim 1, wherein the curing agent is a peroxide or a phenol resin.

8. A thermoplastic elastomer composition obtained by a process consisting essentially of simultaneously kneading and curing at a temperature from 140°–200° C., a mixture which comprises 100 parts by weight of a vinyl chloride resin, from 20–300 parts by weight of a powdery and partially pre-crosslinked copolymer of butadiene and acrylonitrile, from 25–200 parts by weight of a plasticizer, from 10–200 parts by weight of a filler and a curing agent for the rubber which cures the rubber at a temperature of from 140°–220° C., said composition having a tensile strength of at least 120 $kg/cm^2$ and a rate of compression set of not greater than 40% after being compressed at a compression rate of 25% at a temperature of 70° C. over a period of 22 hours and said composition being meltable by a roll set at a temperature of 190° C.

* * * * *